UNITED STATES PATENT OFFICE.

FREDERICK WALTON, OF STAINES, ENGLAND.

IMPROVEMENT IN THE MANUFACTURE OF ARTIFICIAL LEATHER.

Specification forming part of Letters Patent No. 111,100, dated January 17, 1871.

*To all whom it may concern:*

Be it known that I, FREDERICK WALTON, of Staines, in the county of Middlesex, a subject of the Queen of Great Britain, have invented or discovered new and useful Improvements in the Manufacture of Artificial Leather; and I, the said FREDERICK WALTON, do hereby declare the nature of the said invention, and in what manner the same is to be performed, to be particularly described and ascertained in and by the following statement thereof—that is to say:

This invention has for its object improvements in the manufacture of artificial leather.

In making artificial leather, I cement together two or more thicknesses of calico or other fabric by means of oxidized oil-cement, and having so obtained the required thickness I japan the surface as is now practiced in the manufacture of what is generally known as "patent leather."

The method I pursue in cementing the layers of cloth together is to roll the cloth on a roller and place the same in front of an ordinary spreading-machine, such as is used for spreading india-rubber. I then give it several coats or layers, according to the thickness required in the combined cloths—two to four being the most usual quantity; and afterward I take two of these prepared cloths and unite them by pressure in a pair of iron calenders. The calendering-rollers may advantageously be heated. When I desire more than two plies of cloth I repeat the afore-described operation.

The linoleum-cement employed in these processes is composed, by preference, as follows: Oxidized oil, such as may be prepared by spreading boiled linseed-oil on a surface in a thin film, exposing it to currents of warm air until it becomes semi-solid, and then scraping it from the surface, six hundred and twenty-four pounds; kowrie gum, forty pounds; resin, five pounds; whiting, sixty pounds; mineral naphtha, (coal,) two hundred and fifty pounds; methylated spirits of wine, twenty pounds.

Sometimes, in place of using a spreading-machine, I pass the two cloths together between the calendering-rollers. The cement, made to a dough-like consistency by using less solvent, is placed between the cloths at the nip of the rollers. The distance to which the rollers are set regulates the thickness of the compound fabric. The fabric thus prepared may be japanned at once in the ordinary manner; but I prefer, in order to produce a surface of the requisite smoothness to receive the japan, to spread on the compound fabric several coats or layers of the same composition as is used to unite the cloths, excepting that I employed with it lamp-black or other black pigments sufficient to produce a good black surface. (One hundred pounds of lamp-black will be a suitable quantity.) When the surface is sufficiently smooth, which ordinarily may be produced by applying to it five or six thin layers, each layer being dried off at a temperature of about 110°, it is then covered with japan, such as is used in the preparation of patent leather, and placed on flat boards in a japanner's stove and submitted to a temperature of about 120° to 150° Fahrenheit.

The method of conducting this process is well known. Sometimes two or three coats of the japan is required; but one coat suffices for many purposes, especially where the leather is to be grained afterward. By thus using two or more layers of woven fabric to give the required thickness, and cementing them together with a cement which will sustain uninjured the heat of the japanning process, and will also remain flexible for any length of time, I obtain an artificial leather having the pliability of natural leather, and which may be stitched close to the edge without breaking out, and so may be made up in the same way as natural leather.

In manufacturing imitations of japanned leather it is, as already stated, most important that the surface on which the japan is put should be perfectly even and smooth, and any inequality produced by the interlacing of the weft and warp threads, however fine the cloth may be, will be visible on the finished japan surface unless a thick layer of composition is used, and a thick layer is liable to crack at low temperatures. To avoid this objection I sometimes spread the combined fabrics before mentioned with an adhesive linoleum-cement, using but sufficient to attach thereto a fine cotton fleece, which is attached by means of pressing-rollers. The preparation of this fleece is effected by means of a carding-engine, and it is delivered therefrom in the manner usually employed in the manufacture of cotton, as is well known. When I have attached the fleece I spread over it one or more layers of linoleum-cement, colored black, and then I japan it, drying the same in a japanner's stove. In some cases I use other colored japans, and then the color of the cement is varied accordingly. To cause the cotton fleece to adhere to the fabric, the linoleum or oxidized oil-cement is spread upon the compound fabric, and when the cement is still adhesive the fleece is laid evenly upon it, and the fabric and fleece together are passed through the calendering-rollers. In some cases I unite several fleeces or slivers of cotton or other fibers by means of linoleum-cement, and afterward japan them with black or other colored japans.

The cotton fleece is applied, as above described, to a fabric cemented with linoleum-cement, laying on successive layers of the fleece and the cement until a sufficient thickness is obtained. The fabric is then stripped off, leaving the accumulation of cemented fiber as a sheet, which is then further calendered, and spread with a layer of linoleum-cement, mixed with pigment japanned as already described.

When I desire to employ any of the before-mentioned fabrics in imitation of smooth-surfaced, unglazed leathers, such as are used for books or saddlery, I simply surface the combined fabrics with linoleum-cement, colored black or otherwise; and I do not japan them with a polished surface, so that they may afterward, where required, be blacked with shoe or saddlery blacking.

I also make a fabric in imitation of morocco and other costly grained skins in the following manner: I unite two or more plies of cotton or other fabric by means of linoleum-cement, and then I spread several thin layers, or roll one thick layer, of cement thereon. I then place over it a very fine cotton or fleece of cotton, and finish it with colored japan cement to a fine surface. I then emboss this with rollers or plates which have engraved thereon an imitation of the leather-grain required.

In place of oxidized oil-cement, a cement made with kowrie or New Zealand gum, or gum copal, dammar, or sandarac, combined with castor-oil, may be used. The proportion I employ is about one hundred and fifty pounds of gum to sixty pounds of castor-oil. The oil is heated and the gum stirred in until intimately combined.

Having thus described the nature of my said invention, and the manner of performing the same, I would have it understood that what I claim is—

1. The manufacture of japanned and other artificial leather with oxidized oil or linoleum cement, as above described.

2. The manufacture of japanned and other artificial leather with a cement of kowrie or New Zealand gum, gum copal, dammar, or sandarac, combined with castor-oil, as above described.

3. In the manufacture of japanned leather, a fleece of cotton or fiber to prevent the irregularities of the base-fabric from appearing on the japanned surface, as above described.

FRED. WALTON.

Witnesses:
G. F. WARREN,
JOHN DEAN,
*Both of No. 17 Gracechurch Street, London.*
JOHN HARRISON,
*Notary Public.*